United States Patent [19]

Sherwood et al.

[11] 4,312,759

[45] Jan. 26, 1982

[54] PROCESS FOR TREATING AQUEOUS LATEX PAINT WASTE

[75] Inventors: Joseph C. Sherwood; Brunbeck, Richard T., both of Reading, Pa.

[73] Assignee: SCM Corporation, New York, N.Y.

[21] Appl. No.: 215,695

[22] Filed: Dec. 12, 1980

[51] Int. Cl.$^3$ .............................................. C02F 1/52
[52] U.S. Cl. .................... 210/710; 210/737; 210/770; 210/901
[58] Field of Search ............... 210/710, 737, 738, 751, 210/770, 771, 901, 747, 728

[56] References Cited

U.S. PATENT DOCUMENTS

| | | | |
|---|---|---|---|
| 2,978,344 | 4/1961 | Parker et al. | 210/737 |
| 3,753,901 | 8/1973 | Taubman et al. | 210/728 |
| 3,929,586 | 12/1975 | Slikkers, Jr. | 210/737 |
| 4,088,577 | 5/1978 | Müller | 210/770 |
| 4,096,061 | 6/1978 | Brennan | 210/710 |

FOREIGN PATENT DOCUMENTS 2317673 10/1974 Fed. Rep. of Germany ...... 210/770

OTHER PUBLICATIONS

Pinsky, J. L. et al., "Characterization and Disposal of Paint Sludge"; 32nd Ind. Waste Conference, Purdue University 1977; pp. 428–437.

*Primary Examiner*—Benoit Castel
*Attorney, Agent, or Firm*—A. Joseph Gibbons; Gordon P. Becker

[57] ABSTRACT

A process for producing leach-resistant consolidate from the slack sludge precipitated from the flocculating of dilute aqueous latex paint waste is shown. It comprises: rapidly heating said slack sludge with agitation to a temperature which at least approaches the boiling point of the water present in said sludge; settling the resulting heated mixture into a consolidate fraction and a serum fraction; and separating said fractions. Such consolidate can be used for landfill, structural units, or dispersed as a component of a paint.

2 Claims, No Drawings

PROCESS FOR TREATING AQUEOUS LATEX PAINT WASTE

This invention relates to waste disposal, and more particularly to a process for producing leach-resistant consolidate from dilute aqueous latex paint waste. A primary source of such waste is from the manufacture of or use of aqueous latex paints.

BACKGROUND OF THE INVENTION

For some time now it has been conventional to flocculate the resinous and other solids from such aqueous wastes to clarify same. Various flocculating agents suitable for this use include inorganic and organic ones. Some low molecular weight cationic resinous ones can be particularly efficient. Such resins and their flocculating use are shown, for example, in U.S. Pat. Nos. 3,861,887 and 2,995,512. The slack sludge that precipitates typically will have in the vicinity of 20% nonvolatile matter by weight; upon aging such sludge may dry out or otherwise concentrate to as much as 50 to 60% nonvolatile matter. However, such sludge often is objectionable because of its highly aqueous and fluent character and particularly because of its leachability when deposited in landfill.

The instant invention renders such slack material acceptable for disposal in landfill by converting it to a leach-resistant consolidate.

BROAD STATEMENT OF THE INVENTION

One aspect of the invention is a process for producing leach-resistant consolidate from slack sludge precipitated from the flocculation of dilute aqueous latex paint waste which comprises: rapidly heating said slack sludge with agitation to a temperature level which at least approaches the boiling point of the water present in said sludge; settling the resulting heated mixture into a consolidate fraction and a serum fraction; and separating said fractions.

Another aspect of the invention is the consolidate from this process in the form of a structural unit, typically a regular geometric shape.

DETAILED DESCRIPTION OF THE INVENTION

Typically waste suspensions of latex paint result from washing down tanks, vessels, drains, and the like in plants where such paints are made or where such paints are used for coating substrates. Typically such waste will have about 1% (and sometimes less) to at most about 10%, and more likely about 2 to 5% by weight of nonvolatile matter ("solids") including the film-forming latex binder, usually some opacifying pigment such as titanium dioxide, and often various mineral fillers such as fine clay, talc, mica, etc. Occasionally a small proportion of other resinous material can be present, e.g. alkyd resin, also.

The flocculation of such wastes to enhance the sedimentation or filtration of suspended solids is well-known. Often such wastes are slightly akaline, and it usually is advantageous to raise their pH to as much as 9 or so with a base such as sodium hydroxide after flocculating them with resinous flocculating agent, typically a low molecular weight cationic polymer or copolymer.

The slack sludge that settles or otherwise conventionally is separated from the thus-clarified aqueous phase is highly hydrous and fluent. Typically, it will have nonvolatile matter (solids) of about 20% by weight or even less. By rapidly heating and agitating this collected slack sludge to a temperature of at least just below the boiling point of the water present, there appears to be initiated a marked consolidation of the sludge with concomitant expelling of aqueous serum.

The heating of the slack sludge advantageously is done in no longer than an hour, and preferably is accomplished in minutes. One of the most effective and inexpensive ways we have used for such heating is to use direct steam injection into the sludge, the steam both heating and agitating such sludge to induce the consolidation tendency rapidly and cheaply.

The process can be operated at subatmospheric pressure (where the boiling point of the water present is somewhat reduced), but advantageously is no lower than about 180° F. Clearly preferably, however, the process is operated at atmospheric pressure (for efficiency and economy) and, while the temperature can be raised to the boiling point of the water under whatever operating pressure is used, we have found it advantageous and economic simply to heat the slack sludge to a temperature just below the boiling point of the water present, e.g. 200°–210° F. in such atmospheric pressure operation and especially about 208° F., then turn off the steam. If superatmospheric pressure operation were to be used, that would be permissible, but clearly more expensive, as would heating just to boiling or with prolonged boiling.

Because the still tractible heated mass is formed reasonably rapidly, we have found it of special advantage to dump or drain such mass directly into tote tanks for ultimate settlement into the consolidate fraction and the aqueous serum fraction. The tote tanks are simply small, wheeled containers.

After several hours or even a day or more, an aqueous serum can be drained or pumped out of the tote tanks, while the spongy consolidate, looking like a clay, remaining in the tote tanks is dumped into a bin and hauled away to landfill.

If it is desired to make the consolidate into structural shapes such as blocks, it is advantageous to empty the heated mixture into geometrically divided retaining equipment, each division retaining a unit of the consolidate. In such instance, it also can be of advantage to add particulate fillers such as silica, clay, grog, glass, etc. to the slack sludge or to the heated mass while it is still fairly tractible so that shrinkage of the consolidate is restricted and a dense consolidate produced. The consolidate, filled or not, also can be foamed, if desired.

Advantageously the equipment comprises a mechanically agitated tank with direct steam injection inlet (mechanical agitation need not be used always during the steam injection, but it can be, if desired), said tank being emptiable into a plurality of tote tanks or other collectors for the settling of the heated mixture. Mild steel is adequate for most of the equipment construction, although more resistant materials such as stainless steel and the like can be used where necessary or desirable.

The separated consolidate is quite resistant to aqueous leaching, and, therefore, is suitable for landfill or other use. It can be rinsed before use.

The following example shows how the invention has been practiced, but should not be construed as limiting the invention. In this specification all parts are parts by weight, all percentages are weight percentages, and all temperatures are in degrees Fahrenheit unless otherwise expressly noted.

EXAMPLE

An agitated, vertical cylindrical tank with cone bottom is charged with 1,200 gallons of aqueous waste from the preparation of latex paint. The suspended solids amount to about 2 to 3% nonvolatile matter comprising film-forming latex (a copolymer of predominantly vinyl acetate units with 2-ethylhexyl acrylate units), pigmentary titanium dioxide, and mineral filler particles such as clay.

To this mixture there was added with agitation 24 pounds of AMERFLOC 440 flocculating agent (AMERFLOC being a trademark of Drew Chemical Corporation), this agent having the following properties: a golden-colored liquid cationic polyelectrolyte with average molecuar weight of 80,000, specific gravity at 20° C. of 1.03–1.05, Brookfield No. 1 spindle at 100 RPM viscosity 50–80 cps, pH 4.7–5.1, freeze point 0° C., infinitely soluble in water. pH of the mixture is adjusted to 7–8 with the addition of aqueous sodium hydroxide, and the sludge permitted to settle. Three days later supernatant aqueous layer was decanted from the tank to leave a slack sludge containing about 20% nonvolatile matter.

Open steam then was directly injected into said slack sludge while it was being agitated. When the temperature reached 208° F., the mass was drained into a plurality of tote tanks. In these tanks settlement took place for about 24 hours. The serum collected in them was decanted off and the consolidate, a mass that looked something like spongy clay, remained in the tote tanks. These masses were dumped into a bin for hauling to a landfill.

The product consolidate can be used to formulate an oil paint such as a low-cost primer using a conventional milling procedure with alkyd resin and other conventional paint ingredients. It also can be used for compounding or extending latex wall paints. The properties of the consolidate adapting it to these recycling purposes include its high solids level and its ability to retain water.

An independent laboratory tested consolidate made like that exemplified to determine its resistance to leaching in a landfill. The leachate obtained was one prepared according to the EPA leaching method described in "Test Methods for Evaluating Solid Waste, Physical/Chemical Methods" published May, 1980, by the U.S. Environmental Protection Agency. The procedure was as follows:

150 grams of said consolidate (total solids when sample was dried to 105° C. were 42.2%) were placed in 2,400 ml. of high purity water, and the water was stirred for 24 hours. The initial pH was 6.4. It required 22 ml. of 0.5 N acetic acid to obtain and maintain pH of 5 in the resulting water. The slurry was filtered, the filtrate diluted to 3,000 ml., and it was analyzed as follows:

| *Conductivity, micromho/cm. | 386 |
|---|---|
| *pH | 5.4 |
| *Chemical Oxygen Demand, mg COD/liter | 1612 |
| *Total Volatile Solids, mg/liter | 112 |
| *Total Dissolved Solids, mg/liter | 286 |
| *Solvent Extractables, mg/liter | 21 |
| *Total Organic Carbon, mg/liter | 942 |
| Ammonia Nitrogen, mg $NH_3$. N/liter | 8.85 |
| Phenolics, mg $C_6H_5OH$/liter | 24.2 |
| Cyanides, mg CN/liter | <0.02 |

*These values may include a contribution from the constituents of the leaching solution as well as the solution's reaction with the waste.

| | Actual Value | MCL** |
|---|---|---|
| Arsenic, mg AS/liter | less than 0.002 | 5.0 |
| Cadmium, mg Cd/liter | 0.138 | 1.0 |
| Chromium, mg Cr/liter | 0.010 | 5.0 |
| Copper, mg Cu/liter | 0.039 | |
| Lead, mg Pb/liter | less than 0.040 | 5.0 |
| Mercury, micrograms Hg/liter | less than 0.050 | 200 |
| Molybdenum, mg Mo/liter | less than 0.050 | |
| Nickel, mg Ni/liter | 0.036 | |
| Selenium, mg Se/liter | less than 0.002 | 1.0 |
| Silver, mg Ag/liter | less than 0.006 | 5.0 |

**Maximum contaminant levels allowed by the United States EPA for hazardous wastes.

From the foregoing it can be seen that the leachate contained substantially less contamination than is permitted by RCRA Standards as specified by the U.S. Environmental Protection Agency.

What is claimed is:

1. In a process for treating latex paint waste wherein said waste is flocculated with a resinous flocculating agent and allowed to settle until a flocculated slack sludge is formed, the improvement comprising:
   heating said slack sludge with agitation to a
   settling said heated slack sludge to form a leach-resistant consolidate fraction and a serum fraction, and
   separating said fractions.

2. The process of claim 1 which is done at atmospheric pressure wherein the heating is conducted by direct steam injection to attain temperature of at least about 200° F.

* * * * *

UNITED STATES PATENT AND TRADEMARK OFFICE
CERTIFICATE OF CORRECTION

PATENT NO. : 4,312,759
DATED : January 26, 1982
INVENTOR(S) : Joseph C. Sherwood and Richard T. Brunbeck It is certified that error appears in the above-identified patent and that said Letters Patent are hereby corrected as shown below:

Col. 3, line 18, change "molecuar" to --molecular--.
Col. 4, line 43, after "agitation to a" insert --temperature of at least about 180°F,--.

Signed and Sealed this

Eighth Day of June 1982

|SEAL|

Attest:

GERALD J. MOSSINGHOFF

Attesting Officer    Commissioner of Patents and Trademarks